Nov. 20, 1962 M. S. KRUSE 3,064,356
RETRACTABLE PLUMB BOB
Filed May 4, 1959 2 Sheets-Sheet 1

INVENTOR
MELVIN S. KRUSE
BY HIS ATTORNEYS
HARRIS, KIECH, RUSSELL & KERN

Nov. 20, 1962 M. S. KRUSE 3,064,356
RETRACTABLE PLUMB BOB
Filed May 4, 1959 2 Sheets-Sheet 2
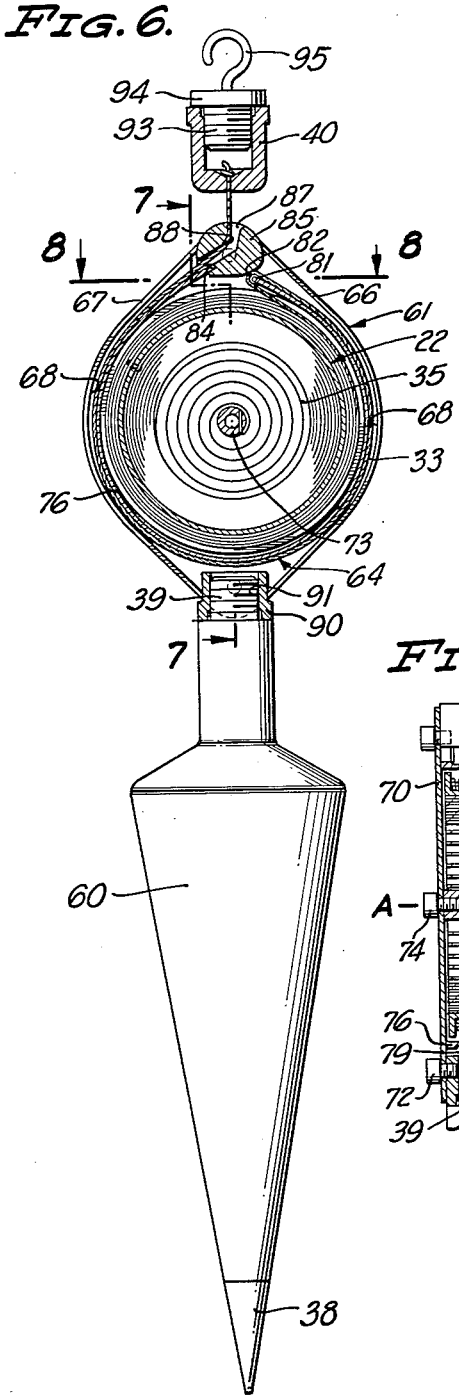
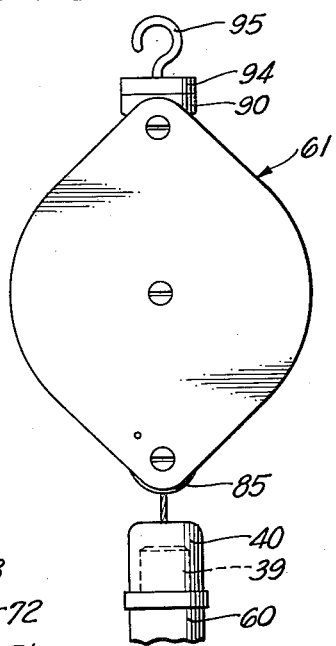
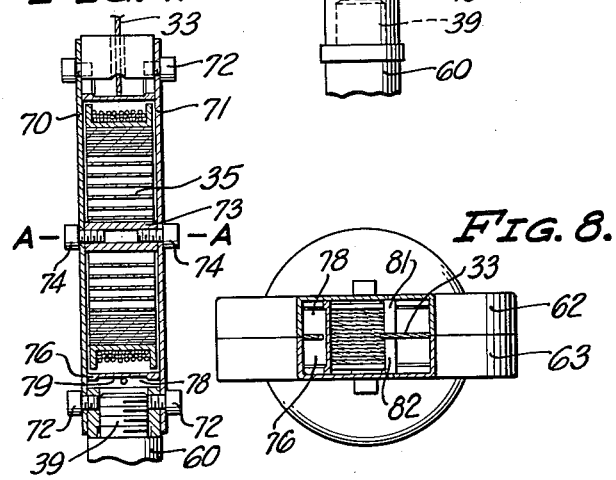
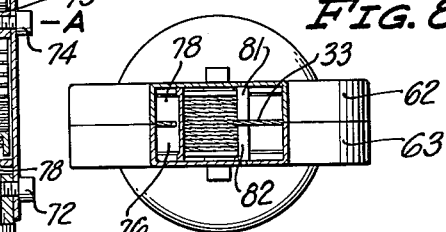
INVENTOR
MELVIN S. KRUSE
BY HIS ATTORNEYS
HARRIS, KIECH, RUSSELL & KERN United States Patent Office 3,064,356
Patented Nov. 20, 1962

3,064,356
RETRACTABLE PLUMB BOB
Melvin S. Kruse, 9525 Holbrook, Pico, Calif.
Filed May 4, 1959, Ser. No. 810,846
8 Claims. (Cl. 33—217)

My invention relates to plumb bobs and more particularly to a retractable plumb bob or line retriever.

Prior retractable plumb bobs have included spring-biased reels journaled within a housing, the biasing action of a wind-up spring being resisted by a mechanical locking device or a frictional relationship between the line and a friction wall. Much inconvenience has been caused by the necessity of manually actuating the mechanical locking device when the plumb bob is in a desired position. The lack of effectiveness in the frictional relationship has often resulted in the plumb bob slipping from a desired position and has created a need for a more effective method of securing a plumb bob in a selected position.

It is an object of my invention to overcome this inconvenience and lack of holding effectiveness by providing a plumb bob structure which will remain in a desired position upon withdrawal of the line.

An object of my invention is to provide a retractable plumb bob structure having a new and better frictional relationship between the line and a friction wall by arranging the friction wall to commence and terminate in rounded shoulders adjacent a narrow line-receiving opening in the housing.

A further object of my invention is to provide a retractable plumb bob structure providing a reel journaled directly within the housing without the use of a pin or stub shaft and providing a circular friction wall spaced radially from the axis of rotation of said reel and substantially completely encircling the reel space.

Another object of my invention is to provide a retractable plumb bob mechanism of a versatile nature which may be incorporated within the plumb bob body or may be mounted within a housing constructed separately and secured at the upper threaded neck of said plumb bob body, or detached from said plumb bob body and secured to a suspension means.

Various other objects and advantages of my invention constitute economy of construction, facility of use by engineers and transit men, and general advantages that will be apparent in part from an inspection of the accompanying drawings and in part from the following description of three exemplary embodiments of the invention.

Referring to the drawings:

FIG. 6 is a view, similar to FIG. 1, showing an alternative embodiment of the invention;

FIG. 7 is a vertical sectional view taken along the line 7—7 of FIG. 6;

FIG. 8 is a horizontal sectional view taken along the line 8—8 of FIG. 6; and

FIG. 9 is a vertical plan view of the invention involving a rearrangement of the composite parts.

Figure 1:
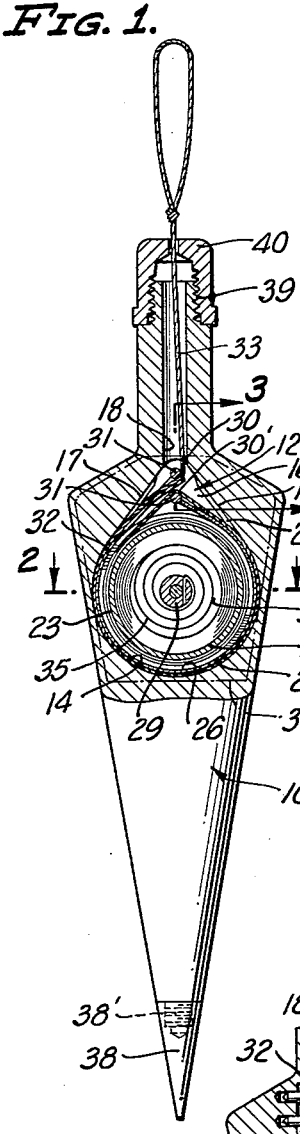
FIG. 1 is a vertical sectional view of one embodiment of the invention, showing the plumb bob in fully retracted position.
Figures 3, 4:
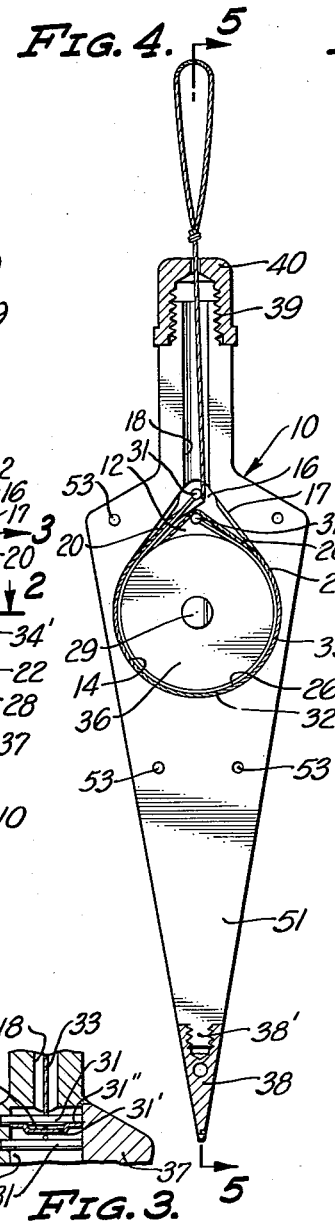
FIG. 3 is a fragmentary vertical sectional view taken along the line 3—3 of FIG. 1.
FIG. 4 is a view, similar to FIG. 1, showing an alternative embodiment.
Figure 2:
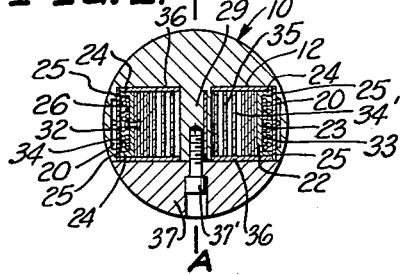
FIG. 2 is a horizontal sectional view taken along the line 2—2 of FIG. 1.

Referring particularly to FIGS. 1, 2, and 3, the plumb bob structure is shown as including a conventional plumb bob body 10 forming a housing for the reel mechanism to be described and having a chamber 12 therewithin bounded by an internal surface having a circular portion 14 disposed about a horizontal axis, the chamber including an upper triangular portion 16 having sides 17 merging with and substantially tangential to said circular portion 14. The circular portion preferably extends through an angle of about 270°, as shown. At the vertex of the triangular portion 16 is a narrow line-receiving opening 18 extending to the exterior of the plumb bob body 10. Throughout the internal surface of the chamber 12 is a peripheral groove 20 (see FIG. 2) which serves to define a line receiving zone.

Within the chamber 12 is a reel 22 having a circular bottom wall 23 with spaced flanges 24 extending radially therefrom these flanges providing circular peripheries 25 sized to be journaled by engaging a wall of the chamber 12, e.g., by engaging the inner surface 26 of a friction member 28. In the illustrated embodiment, this forms the exclusive means for journaling the reel 22 to turn about an axis A—A, a stud 29, hereinafter described, having no such function.

The friction member 28 may be a generally circular band of spring steel of a width to extend completely across the chamber 12. It commences and terminates in rounded shoulders 30 and 30' located adjacent the line-receiving opening 18 in the triangular portion 16 of the chamber. These shoulders partially encircle closely spaced pins 31 which anchor the ends of the friction member 28 to the body 10 and the shoulders are welded, brazed or otherwise secured to the respective pins. It is preferable that the shoulders be at different radial distances from the axis A—A. In the preferred arrangement, the shoulders are positioned one above the other approximately along the midplane of the body 10 as shown in FIG. 1, although some lateral displacement thereof can be employed. The shoulder 30 should, however, be almost directly below the line-receiving opening 18 to act as a guide for the entering line. Adjacent the uppermost of the pins 31 the end of the friction member 28 is shown as centrally channeled to provide a guide passage 31' (FIG. 3) for the line, leaving side portions 31" which are attached to the pin 31. Such local channeling is an excellent way of guiding the line from the entrance shoulder 30 to the outer portion of the friction member 28.

The friction member 28 is of a length to substantially completely encircle the chamber 12. It has circular and tangential end portions generally similar to the circular portion 14 and the sides 17 of the chamber and may itself form the chamber in which the reel 22 turns. Importantly, the friction member 28 has an outer friction surface or friction wall 32 which is spaced radially outward from the axis A—A and the circular bottom wall 23 of the reel. Preferably the friction wall 32 lies close to the inner wall of the chamber 12, forming a circularly elongated line passage therebetween. As shown, the friction member bridges across the peripheral groove 20 so that the friction wall 32 forms a boundary of the line-receiving zone previously mentioned.

A line 33 enters the line-receiving opening 18 and is guided by the entrance shoulder 30 and the guide passage 31' to one end of the line-receiving zone, the latter forming a part of the circularly elongated line passage which extends throughout the length of the friction member 28. The line thus extends between the pins 31 and traverses the complete length of the friction surface or friction wall 32 before bending abruptly over the re-entrant shoulder 30' on its way to the reel 22 where it winds in multiple turns in a line space 34 outside the wall 23 between the flanges 24. The innermost end of the line 33 is connected to the reel, the outermost end of the line being secured or anchored to any member from which the plumb bob is to hang.

Within the circular bottom wall 23 of the reel 22 is a spring space 34 surrounding the stud 29. A spiral spring 35 is wound therein with its inner end connected to the plumb bob body 10 through the stud 29 and with its outer end connected to the reel 22, such connections being made by any conventional means. The spring 35 respectively winds and unwinds as the line 33 is pulled out of or permitted to enter the line-receiving opening 18 of the plumb bob body 10. It biases the line inwardly and tends to retract the line 33 when the latter becomes slack. However, its retractive force varies with the degree to which it is wound and thus with the length to which the line 33 is drawn out. Correspondingly it cannot by itself counterbalance the plumb bob at all withdrawn positions.

To supplement the retractive force and to provide an efficient frictional holding means for the line 33, this line does not enter the chamber 12 from the opening 18 directly to the already wound turns of the reel 22. Rather, its direction is changed over one of the rounded shoulders 30, 30′ and it extends through the peripheral groove 20 in the internal surface of the chamber. As previously mentioned, the line 33 thus rides over and is retarded by the outer friction wall 32 of the friction member 28, the retarding force depending upon the spring tension, which tends to draw the line in, and the weight of the plumb bob body, which tends to draw the line out. These forces, acting in opposition, induce tension in the line 33 with the result that it exerts a pressure on the outer friction wall 32 and frictionally retains the plumb bob body in any desired position free from extension or retraction. The desired position at which the plumb bob body rests in static equilibrium may be altered at any time by a change in the forces inducing the tension in the line 33 and correspondingly the pressure on the outer friction wall 32.

In the embodiment of FIG. 1 the chamber 12 is molded or machined in the body 10 and is closed by a cover 37 conforming to the conical contour of the plumb and held in place by a countersunk screw 37′ threaded into the stud 29. A removable pointed tip 38 also conforms to such contour and is threaded to a stud 38′ of the body. The upper end of the body has the usual threaded neck 39 adapted to receive a cap 40 having an opening through which the line 33 extends.

Figure 5:
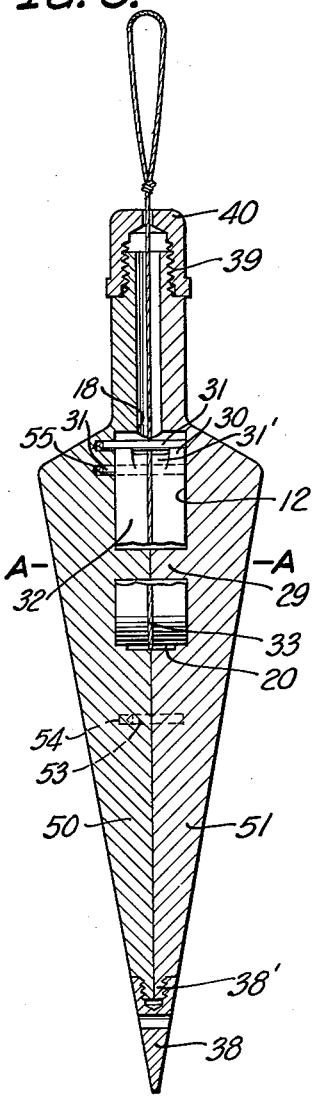
FIG. 5 is a vertical sectional view taken along the line 5—5 of FIG. 4.

In the embodiment of FIGS. 4 and 5 the tip 38 and the cap 40 serve a further function. Here the plumb bob body 10 or housing is formed of two mating sections 50 and 51, one half of the chamber 12 being in each section. The sections 50 and 51 meet at the midplane of the plumb bob whereby each section provides one half of the stud 38′ and the threaded neck 39. The two sections 50 and 51 are held together by threading the pointed tip 38 over the halves of the stud 38′ and threading the line-receiving cap 40 over the halves of the threaded neck 39. To orient the sections in this assembly the section 51 has several pins 53 fitting into corresponding holes 54 in the section 50. The pins 31 previously mentioned are anchored in similar holes 55 in the section 50 as shown in FIG. 5. The stud 29 is formed one half in each section or may be wholly a part of one section. The internal mechanism is as previously described.

The action is further improved if the reel 22 is journalled exclusively by engagement between the circular peripheries 25 of its flanges and the inner circular surface of the chamber. Additional friction at the zones of contact aids the smooth action that characterizes the present invention. Friction plates or steel washers 36 may be positioned in the chamber 12 adjacent each side of the reel 22. Their primary function is to prevent wear on the body 10 as the reel turns, as distinct from exerting a further frictional drag on the reel.

FIGS. 6–8 show a further alternative plumb bob structure in which a conventional plumb bob 60 is associated with a detachable reel mechanism. The conventional plumb bob 60 is shown as having the previously described pointed tip 38 also the threaded neck 39 and the cap 40 normally threaded thereon. The elements in this alternative plumb bob structure can be assembled either as in FIG. 6 or FIG. 9 whereby the reel mechanism can be a part of the plumb bob unit (FIG. 6) or a support for the plumb bob 60.

Here the reel mechanism is in a body or housing 61 comprised of mating halves 62 and 63 (FIG. 8) meeting at a midplane to form a chamber 64 in which is disposed a reel mechanism somewhat similar to that previously described. The housing 61 includes peripheral walls 66 and 67 each having an arcuate internal portion 68 substantially concentric with an axis A—A. Side walls 70 and 71 are joined by screws 72 to the peripheral walls 66 and 67 and extend parallel to each other to enclose the chamber 64. A stud 73 extends between the side walls and two screws 74 received by the ends of the stud secure the mating halves 62 and 63 together.

A friction member 76 encircles the chamber 64 just inside the peripheral walls 66 and 67 and provides a shallow peripheral groove or external channel 78 (FIG. 7) the bottom of which provides a friction surface or wall 79 similar to the wall 32 previously described. One end of the friction member 76 is anchored by a pin 81 which forms a re-entrant shoulder 82 corresponding to the rounded shoulder 30′ previously described. The other end of the friction member 76 is anchored in a notch 84 of a member 85, which member 85 provides a line-receiving opening, indicated at 87, and a rounded entrance shoulder 88, the latter corresponding to the shoulder 30 previously described.

The entering line 33 is guided by the shoulder 88 to one end of the circularly elongated line passage between the housing and the friction member 76, the line extending in friction engagement with the friction surface or wall 79 and then abruptly around the re-entrant shoulder 82 to feed tangentially into the line space of the reel 22 previously described. Here, however, the reel 22 and the spring 35 are reversed in position as compared with FIG. 1 with the result that the reel is oppositely biased and the line 33 loops almost completely backward in extending around the shoulder 82 thus increasing the line friction at this shoulder. The reel 22 and spring 35 in the other embodiments can be similarly inserted in reversed position if such increased friction is desired at the re-entrant shoulder.

At the end of the housing 61 opposite the member 85 is a member 90 providing a socket 91 sized and threaded identically with the cap 40. When assembled as in FIG. 6 the socket 91 receives the threaded neck 39 of the plumb bob 60 to unify the latter and the housing 61 with its internal mechanism. The line-attached cap 40 then receives a threaded portion 93 of a supporting member 94 having a hook 95 adapted to hook over any nail, transit hook, etc. from which the unit is to be suspended. When thus assembled the housing 61 and its internal mechanism increase the effective weight of the plumb bob, being a part thereof.

If this increased effective weight is not desired or if for other reasons it is desired that the housing 61 and its mechanism be separate from the plumb bob 60, the elements can be assembled as in FIG. 9. Here the housing 61 is turned end for end and the portion 93 of the supporting member 94 is threaded into the socket 91 of the member 90. The threaded neck 39 of the plumb then receives the line-penetrating cap 40, the line 33 pulling from the lower end of the housing 61 as the plumb bob 60 is pulled downward to the desired position.

Various changes and modifications can be made from the illustrated examples of the invention without departing from the spirit of the appended claims.

What is claimed is:

1. In combination with a plumb bob having a threaded neck, a line for suspending the bob, a cap to which the line is secured removably threaded on said neck, and a supporting member having a portion sized and threaded identically with said threaded neck, a retracting device for the line including: a housing having a line-receiving opening at one end and a socket at the other end, said socket being sized and threaded identically with said cap to selectively receive said threaded neck or said supporting member; a reel in said housing turning about an axis therein, said reel providing a line space and a spring space; a spiral spring in said spring space having its ends respectively connected to said housing and to said reel; and friction means between said line-receiving opening and said reel space, said spring biasing said reel to wind thereon the line entering said line-receiving opening after passage over said friction means.

2. A retractable plumb bob, including: a plumb bob structure including a housing having a chamber bounded by an inwardly facing curved peripheral wall disposed about an axis, said housing having a line-receiving opening at its upper end extending therethrough and communicating with said chamber; a reel in said chamber having a circular bottom wall and flanges extending outward therefrom to define a line space outside said bottom wall, the space within said circular bottom wall being a spring space, said flanges having circular peripheries; a curved friction member within said chamber substantially completely encircling said axis disposed between said inwardly facing peripheral wall and said circular peripheries of said flanges, said curved friction wall having a curved inner surface slightly larger than said circular peripheries and encompassing same in journalling relationship when said reel is displaced from said axis in any radial direction, there being a line-receiving space between the external surface of said friction member and said curved peripheral wall of said housing respectively bounded inwardly and outwardly thereby, said line-receiving space starting and terminating adjacent said line-receiving opening of said housing and extending substantially completely around said axis, there being a rounded shoulder at the terminal end of said line-receiving space; and a line extending through said line-receiving opening having a portion wound on said reel in said line space thereof, said line extending from said line-receiving opening along said line-receiving space in frictional relation with said external surface of said curved friction member to said shoulder, said line extending around said shoulder and thence into said line space of said reel to said portion of said line wound therein in a direction tangential to the latter.

3. A retractable plumb bob as defined in claim 2 in which said line includes a shoulder-adjacent portion within said line-receiving space adjacent said shoulder approaching said shoulder in a first direction as said line is being wound on said reel, in which said spring biases said reel in a direction to move in substantially an opposite direction those portions of its circular peripheries adjacent said shoulder, and in which said tangential direction of said line extending from said shoulder to said wound portion of said line in said line space of said reel is substantially opposite said first direction in which said shoulder-adjacent portion of said line approaches said shoulder.

4. A retractable plumb bob, including: a plumb bob structure including a housing having a chamber bounded by an inwardly facing curved peripheral wall disposed about an axis of said chamber, said chamber including a tapered portion at one end of said housing having sides merging with and substantially tangential to said curved peripheral wall, said housing having a line-receiving opening extending therethrough and communicating with said tapered portion of said chamber; a curved friction member within said chamber having a circular portion paralleling and adjacent said inwardly facing curved peripheral wall throughout the length thereof, said friction member having substantially straight end portions tangential to said circular portion extending into said tapered portion of said chamber and terminating therein in ends adjacent said line-receiving opening, said friction member and said curved peripheral wall providing respectively the inner and outer boundaries of a line-receiving space extending substantially completely around said axis; a reel in said chamber journalled to turn about said axis, said reel having a circular bottom wall and flanges extending outward therefrom to define a line space outside said bottom wall bounded outwardly by said circular portion of said friction member throughout the length of said circular portion, the space within said bottom wall being a spring space; a spiral spring within said spring space having inner and outer ends respectively attached to said housing and said reel; a line passing through said line-receiving opening and having a portion wound on said reel in said reel space; a first shoulder adjacent one end of said line-receiving space at one of said ends of said end portions of said friction member guiding said line from said line-receiving opening into said one end of said line-receiving space; and a second shoulder adjacent the other end of said line-receiving space at the other of said ends of said end portions of said friction member, said line extending from said line-receiving opening around said adjacent first shoulder and thence along said line-receiving space substantially completely around said chamber in contact with the exterior of said friction member to said tapered portion of said chamber and thus to a position adjacent said line-receiving opening of said housing, said line then extending from said last-named position around said second shoulder and thence into said line space of said reel tangential to said portion of said line wound therein.

5. A retractable plumb bob as defined in claim 4 including an anchor pin supported by said housing adjacent at least one of said ends of said end portions of said friction member, such end partially encircling said pin to anchor such end and provide the corresponding one of said first and second shoulders.

6. A retractable plumb bob as defined in claim 4 including first and second anchor pins supported by said housing adjacent said line-receiving opening and respectively anchoring the ends of said end portions of said friction member, said second shoulder being formed by a portion of the corresponding end portion partially encircling said second anchor pin, said friction member providing a guide passage adjacent said first anchor pin, said line extending from said line-receiving opening of said housing between said anchor pins, thence around said first shoulder and thence through said guide passage to said line-receiving space.

7. A retractable plumb bob as defined in claim 4 in which said first shoulder is closer to said line-receiving opening than said second shoulder.

8. In combination: a plum bob structure including side walls and an inwardly facing peripheral wall bounding a chamber having an axis, there being a line-receiving opening communicating with said chamber; a curved friction member in said chamber providing a friction surface facing toward said inwardly facing peripheral wall and bounding an elongated line passage disposed therebetween, said curved friction member providing a shoulder at one end of said elongated line passage; a line extending into said chamber through said line-receiving opening and thence into the other end of said elongated line passage and along said friction surface to and abruptly around said shoulder at the other end of said elongated line passage to provide a tangential feed portion of the line traversing a portion of said chamber in a direction tangential to a circle concentric with said axis; and means for substantially changing the angle of said tangential feed portion of said line with respect to said axis to extend respectively in directions on opposite sides of said axis and thus change the area of engagement of said line with said shoulder in its abrupt turn therearound, said means including a reel having an outer line space and an inner spring space, a spiral spring within said spring space having an inner anchor end and having an outer end attached to said reel, said reel and its attached spring being selectively insertable in said chamber in a first position in which said spring winds upon turning of said reel about said axis in one direction and a second position in which said spring winds upon turning of said reel about said axis in an opposite direction, and means for anchoring said inner end of said spring to said plumb bob structure in each of said first and second positions, said line being wound in said line space of said reel, said tangential feed portion of said line being always that portion of said line extending between said shoulder and the last-wound turn of the wound line in said line space.

References Cited in the file of this patent
UNITED STATES PATENTS

| | | |
|---|---|---|
| 584,803 | Wilcox | June 22, 1897 |
| 831,775 | Curry | Sept. 25, 1906 |
| 1,349,565 | Ewing et al. | Aug. 17, 1920 |
| 1,357,270 | Bush | Nov. 2, 1920 |
| 2,849,805 | Kruse | Sept. 2, 1958 |